(12) United States Patent
Itoh (10) Patent No.: US 6,344,013 B1
(45) Date of Patent: Feb. 5, 2002

(54) TOROIDAL-TYPE CONTINUOUSLY VARIABLE TRANSMISSION AND METHOD FOR MANUFACTURING TRUNNION FOR USE IN SAME TRANSMISSION

(75) Inventor: Hiroyuki Itoh, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/503,151

(22) Filed: Feb. 11, 2000

(30) Foreign Application Priority Data

Feb. 15, 1999 (JP) .......................................... 11-035995

(51) Int. Cl.⁷ .......................... F16H 15/38; B21D 31/00
(52) U.S. Cl. ............................. 476/40; 29/465; 29/509; 72/377
(58) Field of Search ..................... 476/40, 42; 29/465, 29/509, 513; 72/377

(56) References Cited

U.S. PATENT DOCUMENTS

| 3,160,479 A | * | 12/1964 | Davenport | .................. | 428/582 |
| 4,096,730 A | * | 6/1978 | Martin | ......................... | 72/352 |
| 5,577,322 A | * | 11/1996 | Sawai et al. | ........... | 29/898.066 |
| 6,176,806 B1 | * | 1/2001 | Okubo et al. | .................. | 476/73 |
| 6,196,946 B1 | * | 3/2001 | Sawai et al. | .................. | 476/73 |

FOREIGN PATENT DOCUMENTS

JP 62-71465 5/1987 ........... F16H/15/38

\* cited by examiner

*Primary Examiner*—Allan D. Herrmann
(74) *Attorney, Agent, or Firm*—Sughrue Mion, PLLC

(57) ABSTRACT

The toroidal-type continuously variable transmission includes an input disk, an output disk disposed coaxially with the input disk, a trunnion capable of swinging about its pivot shaft portion situated at a torsional relation with respect to the respective center axes of the input and output disks; and a power roller supported on the trunnion and inclinably rollable on and between the input and output disks. The trunnion includes a main body plane portion for holding a displacement shaft supporting the power roller rotatably and a pair of pivot shaft portions respectively formed in the two end portions of the main body plane portion integrally therewith, while two connecting portions respectively between the main body plane portion and the pair of pivot shaft portions are respectively formed so as to include continuous metal flows.

5 Claims, 7 Drawing Sheets

TOROIDAL-TYPE CONTINUOUSLY VARIABLE TRANSMISSION AND METHOD FOR MANUFACTURING TRUNNION FOR USE IN SAME TRANSMISSION

BACKGROUND OF THE INVENTION

1. Field of the Invention

The present invention relates to a toroidal-type continuously variable transmission for an automobile and a method for manufacturing a trunnion for use in the present toroidal-type continuously variable transmission.

2. Description of the Related Art

Figure 4:
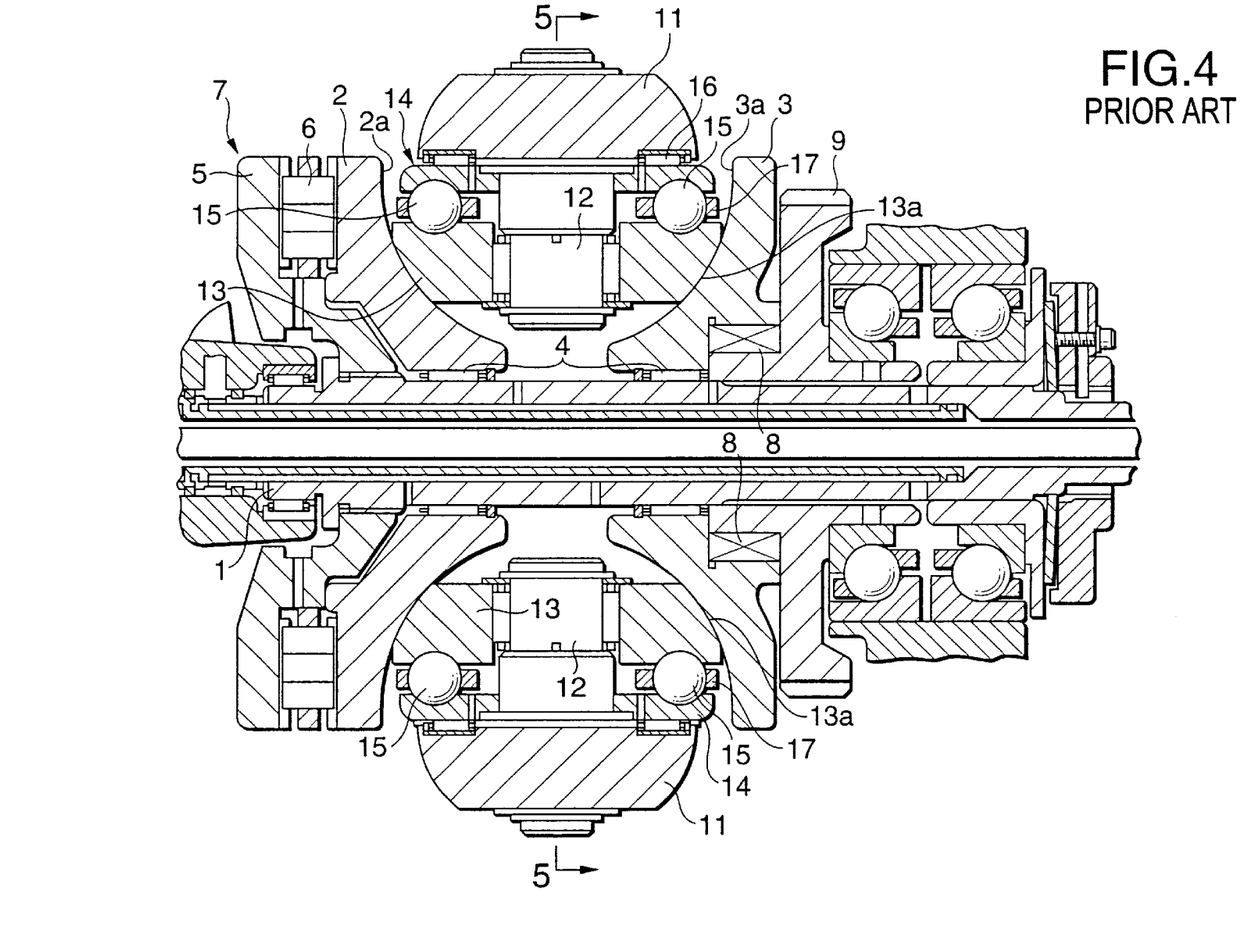
FIG. 4 is a longitudinal side section view of a conventional toroidal-type continuously variable transmission.
Figure 5:
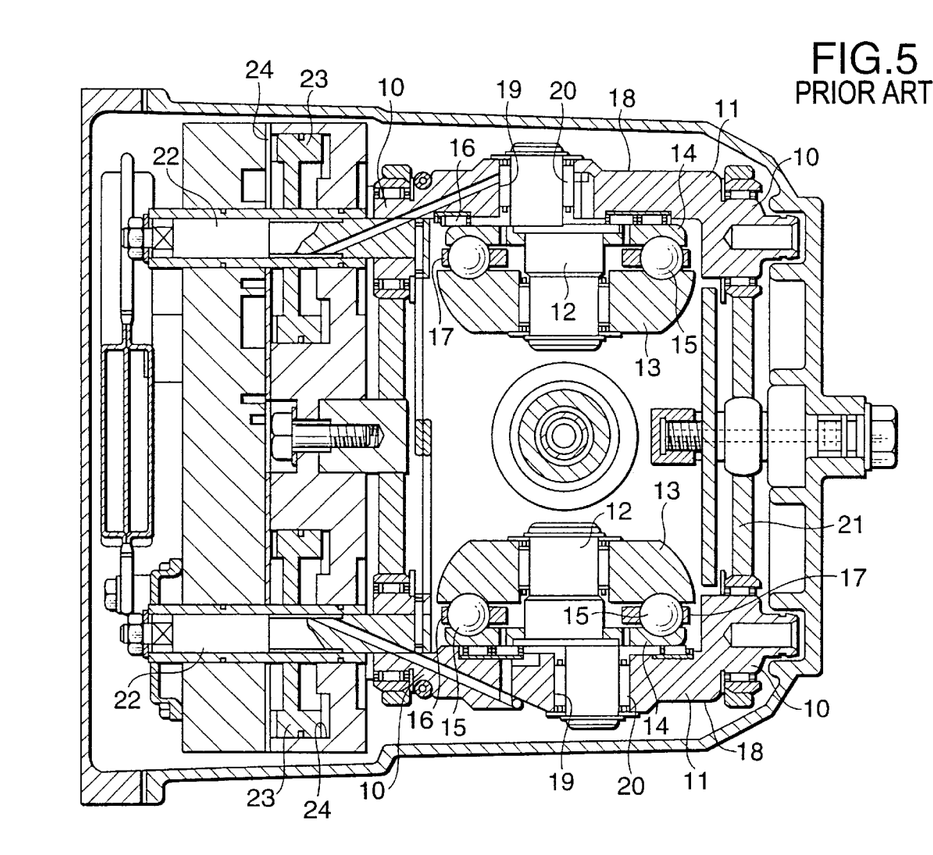
FIG. 5 is a section view taken along the line 5—5 shown in FIG. 4.

Conventionally, a toroidal-type continuously variable transmission is known, for example, in Japanese Utility Model Unexamined Publication No. 62-71465 of Showa. That is, as shown in FIGS. 4 and 5, on a shaft 1, there are rotatably supported an input disk 2 and an output disk 3 through needle shafts 4. On the back surface side of the input disk 2, a cam plate 5 is spline engaged with the shaft 1, a plurality of rollers 6 are interposed between the cam plate 5 and input disk 2, and there is disposed a pressure mechanism 7 of a loading cam type which is used to press the input disk 2 toward the output disk 3 side. The output disk 3 is engaged with an output gear 9 through a key 8, so that the output disk 3 and output gear 9 are able to rotate synchronously with each other.

Between the input disk 2 and output disk 3, there is interposed a trunnion 11 which is able to swing about a pivot shaft portion 10 and, in the central portion of the trunnion 11, there is disposed a displacement shaft 12. And, on the displacement shaft 12, there is rotatably supported a power roller 13. This power roller 13 includes a traction portion in contact with the input disk 2 and output disk 3, while the power roller 13 is rollably contacted in such a manner that it can incline on and between the input disk 2 and output disk 3.

Also, between the trunnion 11 and power roller 13, there is disposed a power roller bearing 14. This power roller bearing 14, while carrying a load applied to the power roller 13 in its thrust direction, allows the rotation of the power roller 13. In the power roller bearing 14, a plurality of balls 15 are held by an annular retainer 17 which is interposed between an annular outer race 16 disposed on the trunnion 11 side and the power roller 13 serving as a rotary part.

Further, the trunnion 11 comprises a main body plane portion 18 and the above-mentioned pivot shaft portions 10 respectively formed integrally with the two end portions of the main body plane portion 18; and, in the main body plane portion 18, there is formed a circular hole 19. In the circular hole 19, there is disposed a needle bearing 20, so that the displacement shaft 12 is supported in a freely rotatable manner. Also, the two pivot shaft portions 10 respectively disposed on the two end sides of the trunnion 11 are respectively supported on a support plate 21 in such a manner that they can be swung with respect to the support plate 21, whereby the inclination angle of the displacement shaft 12 can be freely adjusted by the swing motion of the trunnion 11.

Further, to one end portion of each of the trunnions 11, there is connected a drive rod 22; on the outer peripheral surface of the middle portion of the drive rod 22, there is disposed a drive piston 23; and, a drive cylinder 24 is inserted into the drive piston 23.

According to the above-structured toroidal-type continuously variable transmission, rotation transmitted to the cam plate 5 of the pressure device 7 from a drive source such as an engine is transmitted through the rollers 6 to the input disk 2. The rotation of the input disk 2 is transmitted through the power roller 13 to the output disk 3, while the rotation of the output disk 3 is taken out from the output gear 9.

To change a rotation speed ratio between an input side and an output side, a pair of drive pistons 23 may be shifted in the mutually opposite directions. With such shifts of the drive pistons 23, the trunnions 11 are also respectively shifted in the mutually opposite directions. This changes the direction of the tangential-direction force that acts on the contact portions between the peripheral surfaces 13a of the power rollers 13 and the inner peripheral surfaces 2a, 3a of the input and output disks 2, 3; and, with such change in the direction of this force, the trunnions 11 are respectively swung in the mutually opposite directions about their associated pivot shaft portions 10 pivotally supported by the support plate 21.

Figure 6:
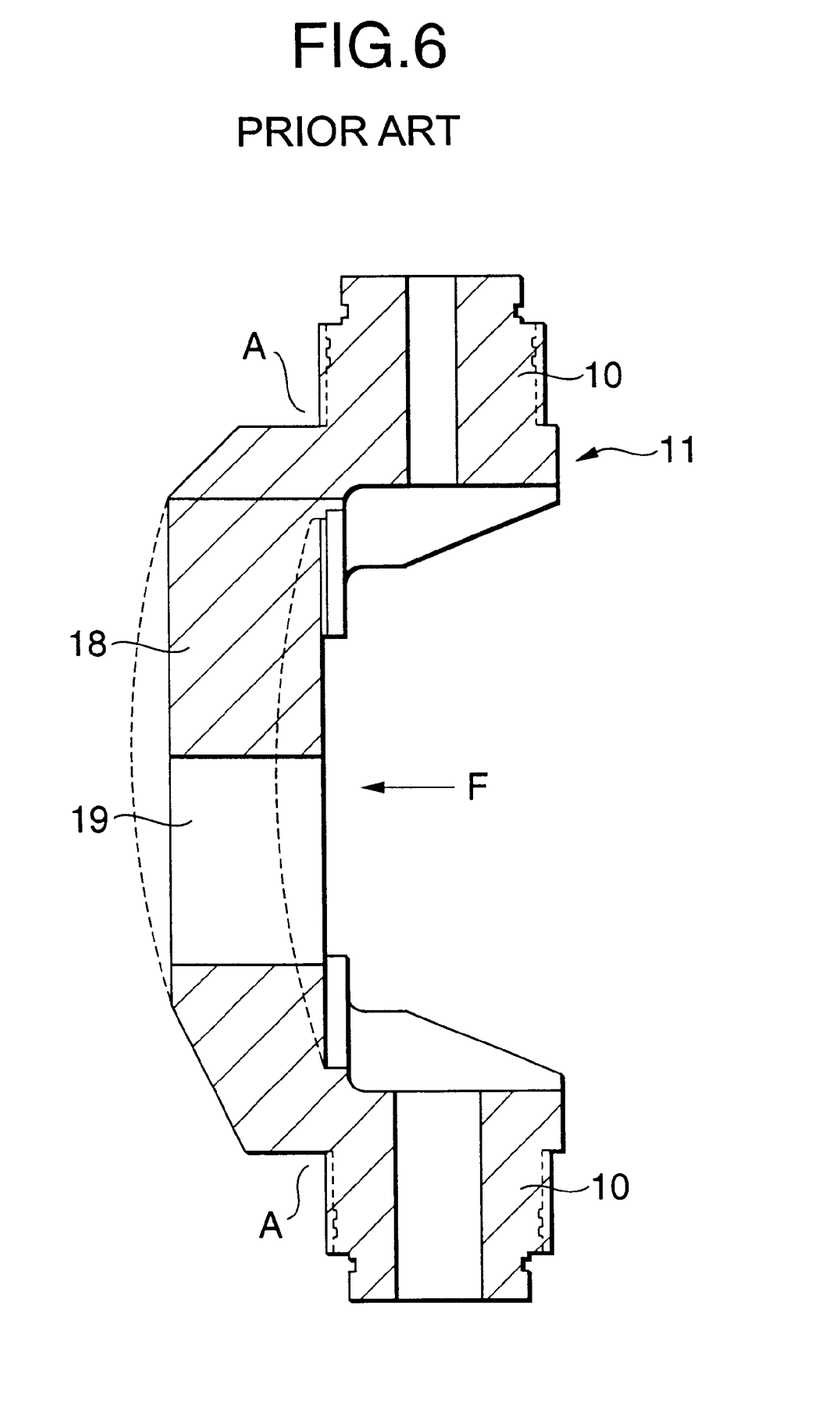
FIG. 6 is a longitudinal side section view of a conventional trunnion.

By the way, as shown in FIG. 6, the conventional trunnion 11 is worked by cutting a blank material consisting of a round rod. And, in case the trunnion 11 is experimentally assembled into a toroidal-type continuously variable transmission and a large torque is repeatedly input to the toroidal-type continuously variable transmission, an excessive load is input to the power roller 13, with the result that an excessive load is repeatedly applied to the trunnion 11 backing up the power roller 13.

On the other hand, since the toroidal-type continuously variable transmission is carried on board a car, the trunnion 11 must also have the necessary and minimum dimension. Therefore, due to the large load repeatedly applied, the center portion of the main body plane portion 18 of the trunnion 11, while supporting the two ends of the pivot shaft portions 10, is bent repeatedly. That is, when the displacement is large, there is applied a force of 4t or more when the maximum load of the engine of the car is applied to the trunnion 11 in the maximum deceleration, so that there is applied to the trunnion 11 such a large bending stress as shown by a broken line in FIG. 6.

As a result of this, the connecting portions A between the pivot shaft portions 10 and main body plane portion 18, in which the stress becomes the highest, is pulled and returned back to their original conditions repeatedly; that is, the bending stress is applied collectively to the connecting portions A, so that the connecting portions A are finally cracked and broken.

Figure 7:
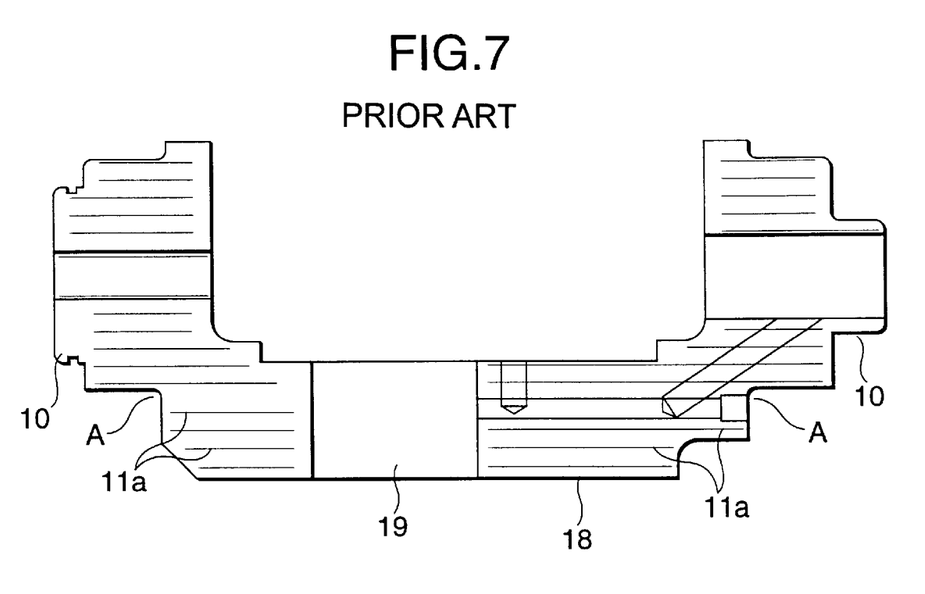
FIG. 7 is a longitudinal side section view of a conventional trunnion.

The reason for this is believed that the conventional trunnion 11 is formed by cutting a round rod and thus, as shown in FIG. 7, metal flows 11a at the high-stress portions of the trunnion 11 are cut off. Therefore, the present inventors have conducted another test in which a trunnion 11 is formed by cutting a flat plate instead of the round rod. However, in this test as well, the results are similar to those in the former test.

SUMMARY OF THE INVENTION

The present invention aims at eliminating the drawbacks found in the conventional toroidal-type continuously variable transmission. Accordingly, it is an object of the invention to provide a toroidal-type continuously variable transmission which can prevent a trunnion against damage even when an excessive load is repeatedly applied thereto to thereby be able to enhance the durability of the trunnion and thus the toroidal-type continuously variable transmission.

In attaining the above object, according to the invention, there is provided a toroidal-type continuously variable transmission comprising: an input disk; an output disk disposed coaxially with the input disk; a trunnion capable of swinging about its pivot shaft portion situated at a torsional relation with respect to the respective center axes of the input and output disks; and a power roller supported on the trunnion and inclinably rollable on and between the input and output disks, wherein the trunnion comprises a main body plane portion for holding a displacement shaft supporting the power roller rotatably and a pair of pivot shaft portions respectively formed in the two end portions of the main body plane portion integrally therewith, while two connecting portions respectively between the main body plane portion and the pair of pivot shaft portions are respectively formed so as to include continuous metal flows. Here, "torsional relation" of the pivot shaft portion means a physical relation that the pivot shaft portion is disposed at position along an imaginary plane that is perpendicular to an imaginary line connecting the respective center axes of the input and output disks and distanced from the intersection of the imaginary plane and imaginary line.

Also, according to another aspect of the invention, there is provided a method for manufacturing the trunnion, wherein a blank material of the trunnion is disposed in upper and lower forging dies in such a manner that the metal flows of the blank material extend in parallel to the axial direction of the trunnion and, after then, the blank material is pressed in a direction at right angles to the axial direction of the present blank material, thereby producing the trunnion by forging.

In the trunnion, generally, an excessive stress is concentrated on the connecting portions between the main body plane portion and two pivot shaft portions. However, according to the present structure, since the metal flows of the blank material are allowed to extend along the configuration of the connecting portions, the metal flows are prevented from being cut in the portion where the stress is concentrated, which not only can enhance the strength of the trunnion but also, even when loads are input repeatedly, can prevent the trunnion from cracking to thereby be able to enhance the durability of the trunnion and thus the toroidal-type continuously variable transmission using such trunnion.

Also, in another aspect of the invention, in order that the metal flows of the blank material are allowed to extend along the connecting portions, the trunnion is manufactured by forging. To manufacture the trunnion by forging, at first, the blank material is disposed in the upper and lower forging dies in such a manner that the metal flows of the blank material extend in parallel to the trunnion axis direction and, after then, the blank material is forged in a direction at right angles to the axial direction of the blank material, that is, in the tightening direction of the upper and lower forging dies, so that the metal flows are made to extend along the connecting portions between the trunnion main body plane portion and the trunnion pivot shaft portions, thereby being able to enhance the strength of the connecting portions.

DETAILED DESCRIPTION OF THE PREFERRED EMBODIMENTS

Now, a description will be given below of the preferred embodiments of the invention with reference to the accompanying drawings.

Figure 1A:
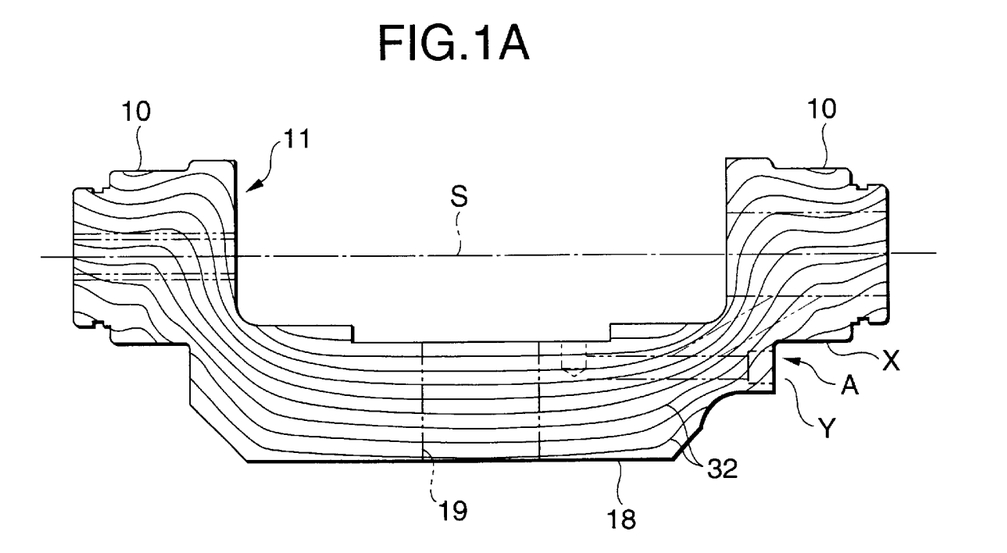
FIG. 1A a longitudinal side section view showing a trunnion for use in a toroidal-type continuously variable transmission according to a first embodiment of the invention.

FIGS. 1A to 3 shows a first embodiment of a toroidal-type continuously variable transmission according to the invention and, in more particular, a trunnion employed in the first embodiment. In the present embodiment, a description will be given below of the present trunnion while the same components thereof as those in the conventional trunnion are given the same designations. Now, FIGS. 1A and 1B show a trunnion 11 employed in the present toroidal-type continuously variable transmission. The trunnion 11 comprises a main body plane portion 18 and two pivot shaft portions 10 respectively formed integrally with the two end portions of the main body plane portion 18, while, in the main body plane portion 18, there is formed a circular hole 19 which is used to hold a displacement shaft 10 through a needle bearing 20 in a freely rotatable manner. Also, the two pivot shaft portions 10 on the two end portion sides of the trunnion 11 are respectively supported on a support plate 21 in a freely swingable manner, whereby the inclination angle of the displacement shaft 12 can be freely adjusted due to the swing motion of the trunnion 11.

Figure 2A:
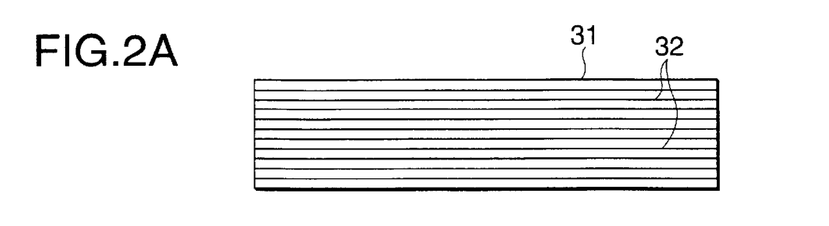
FIGS. 2A to 2D are longitudinal side section views of the trunnion, showing a process for manufacturing the trunnion.

Now, FIGS. 2A to 2D show a process for manufacturing the trunnion 11. Specifically, FIG. 2A shows a blank material 31 which consists of a round rod. This blank material 31 is made of chrome molybdenum steel (SCM) 445 having a carbon content of 0.45%; a surface portion hardness of the order of Rockwell C hardness (HRC) 61 and a core portion hardness of the order of HRC 36, after the blank material 31 is thermally treated into a finished product as the trunnion 11. Or, in the case of using SCM 435, the blank material 31 is thermally treated using a carbon content of 0.35% in such a manner that, after completion of the blank material 31 as the trunnion 11, the pivot shaft portion 10 of the trunnion 11 has a surface portion hardness of the order of HRC 59 and a core portion hardness of the order of HRC 32. Or, in case of using SCM 45C, the blank material 31 is thermally treated using a carbon content of 0.45% in such a manner that, after completion of the blank material 31 as the trunnion 11, the pivot shaft portion 10 of the trunnion 11 has a surface portion hardness of the order of HRC 59 and a core portion hardness of HRC 38. And, the blank material 31 has a plurality of metal flows 32 in the axial direction thereof.

Figure 2B:
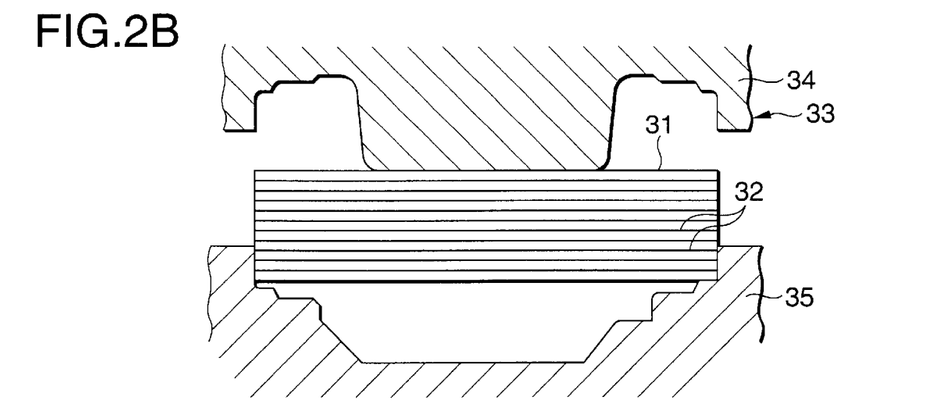

Now, FIG. 2B shows a state in which the blank material 31 is set in a forging die 33, while the forging die 33 is composed of an upper die portion 34 and a lower die portion 35. A die split line 36 (see FIG. 2C) is formed in the vicinity of the center line of the pivot shaft portion 10 of the trunnion 11, while the main body plane portion 18 of the trunnion 11 has steps respectively between its two end portions and center portion in such a manner that it can be divided in the vicinity of its center in the thickness thereof. And, the blank material 31 is disposed in the forging die 33 in such a manner that its metal flows 32 are parallel to the axial direction of the trunnion 11.

Figure 2C:
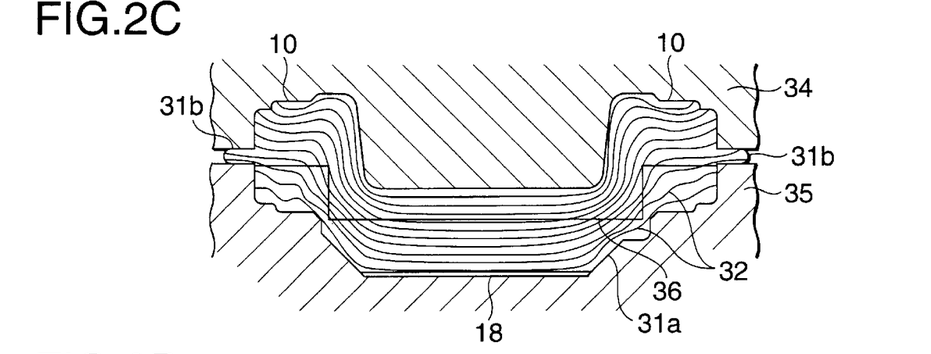

Now, FIG. 2C shows a state in which the blank material 31 is held by and between the upper and lower die portions 34 and 35 of the forging die 33 and a forging operation is executed on the blank material 31 so as to press the blank material 31 in a direction at right angles to the axial direction of the blank material 31. The blank material 31 is produced as a forged blank material 31a having a shape following the shapes of the upper and lower die portions 34 and 35 and, burrs 31b are formed on the end faces of the pivot shaft portions 10.

Figure 2D:
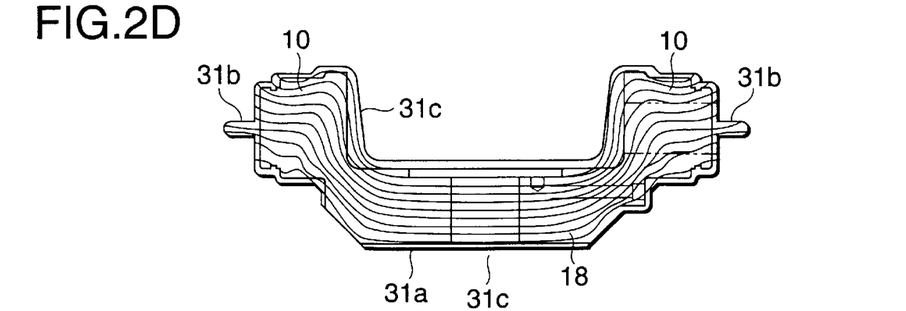

Now, FIG. 2D shows a state in which the forged blank material 31a is taken out of the forging die 33, while, roughened surfaces 31c are left on the outer peripheral surface of the forged blank material 31a.

Next, the burrs 31b and roughened surface 31c of the forged blank material 31 are cut by milling, and the forged blank material 31a is then thermally treated. After then, the forged blank material 31a is finish worked by grinding, so that there is completed such trunnion 11 as shown in FIG. 1A.

Figure 1B:
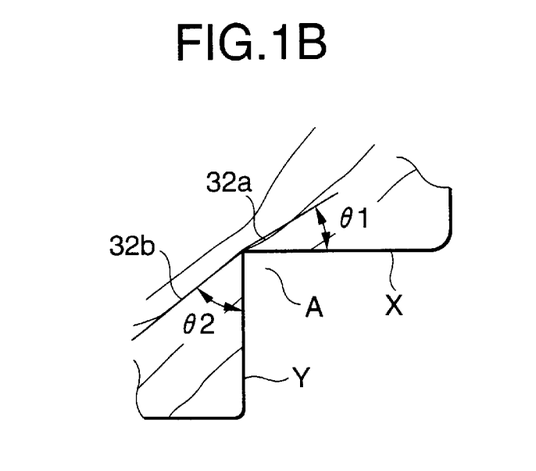
FIG. 1B is an enlarged longitudinal side section view showing a connecting portion between a pivot shaft portion and a main body plane portion of the trunnion.

In the trunnion 11 produced by forging in this manner, the metal flows 32 continue along the connecting portion A between the main body plane portion 18 and pivot shaft portion 10. When the connecting portion A is enlarged, there can be obtained such a state as shown in FIG. 1B.

That is, since, even when the trunnion 11 is manufactured by forging, it is finished using post-working such as cutting and grinding, it is difficult to leave, as they are, the metal flows 32 formed by forging in the finished trunnion 11, with the result that, when cutting the connection portion A, the metal flows are actually cut off.

Accordingly, from the viewpoint of bending fatigue strength, the present inventors have conducted tests as to whether the sizes of inclination angles θ of the metal flows 32 in the connecting portion A have an influence on the strength of the trunnion. The connecting portion A is an angular portion having a substantially right angle; and, the connecting portion A includes a first surface X substantially parallel to the center S of the trunnion axis and a second surface Y substantially at right angles to the first surface X. In the tests, an inclination angle formed by the first surface X and the metal flow 32a that is nearest to the angular portion of the connecting portion A was expressed as $\theta_1$, an inclination angle formed by the second surface Y and the metal flow 32a that is nearest to the angular portion of the connecting portion A was expressed as $\theta_2$, a larger one of $\theta_1$ and $\theta_2$ was set as a trouble-free allowable angle θmax, and the allowable angle θmax was tested variously. The results of these tests have shown that the allowable angle θmax may be $\leq 30°$, preferably, the allowable angle θmax may be $\leq 20°$.

In the tests, there was used a toroidal-type continuously variable transmission of a double cavity type with a toroidal cavity diameter of 130 mm; and, the tests were repeated $1 \times 10^6$ times, which corresponds to the target number of times of repetitions of starting of a car, in the input conditions of the maximum deceleration ratio of 2.2 and an input torque of 340 Nm. The results of the tests are as shown in Table 1 and FIG. 3. Specifically, there were as shown in Table 1 and FIG. 3. Specifically, there were manufactured trunnions having different metal flow angles and these trunnions were tested each by twice. By the way, in FIG. 3, black round marks show the results of the first test, whereas black triangle marks show the results of the second test.

TABLE 1

| | Angle of metal flow to surface of trunnion connecting portion θmax | Number of times of endurance repetitions and results |
|---|---|---|
| Embodiment 1 | 10° (Forging) | Cut off by $5 \times 10^6$ and $5 \times 10^6$ |
| Embodiment 2 | 20° (Forging) | Cut off by $5 \times 10^6$ and $5 \times 10^6$ |
| Embodiment 3 | 30° (Forging) | Crack occurred in angular portion in $4.5 \times 10^6$ and $4.2 \times 10^6$ |
| Comparison Example 1 | 40° (Forging) | Crack occurred in angular portion in $3.9 \times 10^5$ and $5.1 \times 10^5$ |
| Comparison Example 2 | 50° (Forging) | Crack occurred in angular portion in $8.9 \times 10^4$ and $7.2 \times 10^4$ |
| Comparison Example 3 | 60° (Forging) | Crack occurred in angular portion in $5.8 \times 10^4$ and $4.7 \times 10^4$ |
| Comparison Example 4 | 90° (Cutting from round rod) | Crack occurred in angular portion in $3 \times 10^4$ and $3.6 \times 10^4$ |

Figure 3:
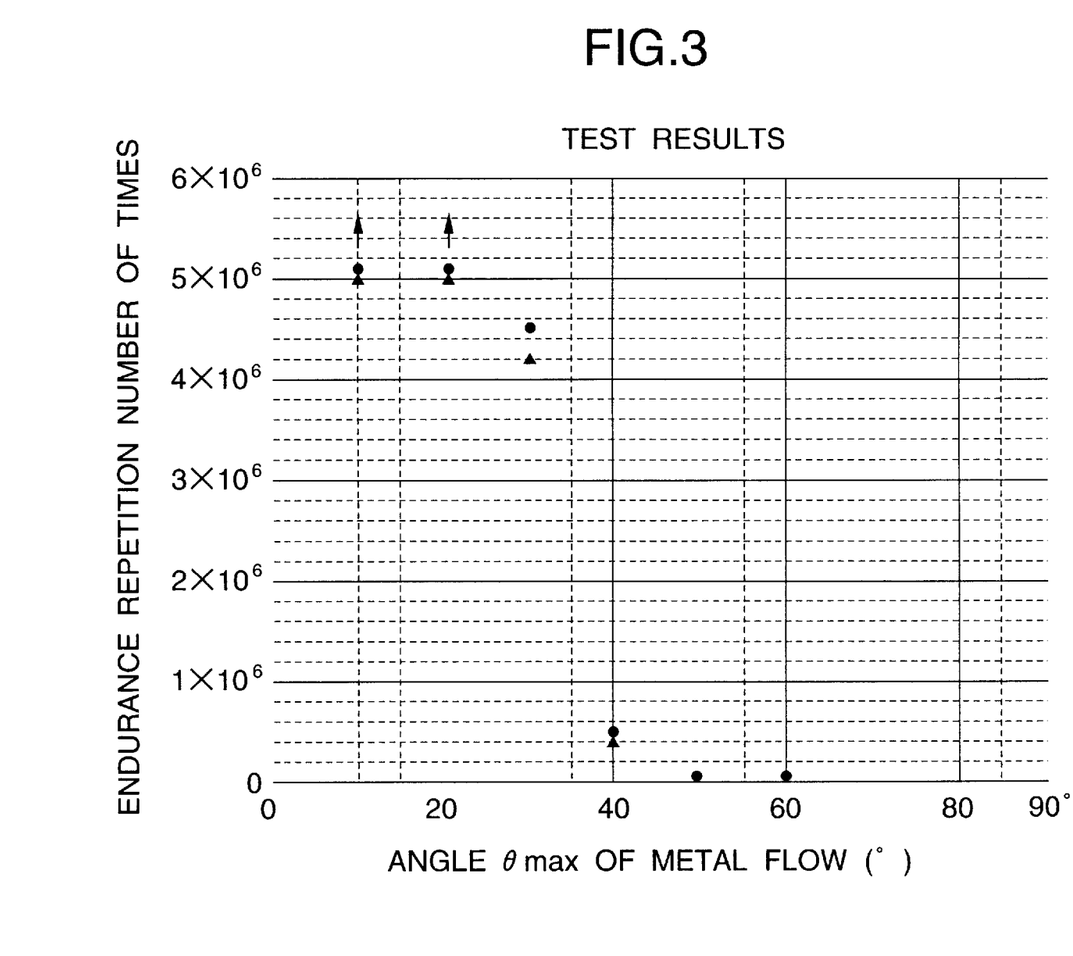
FIG. 3 is a graphical representation of the results of a test conducted on the trunnion.

As can be seen from comparison examples 1 to 4 respectively shown in Table 1, when θmax is equal to or larger than 40°, cracks occurred early in the angular portion of the connecting portion A. On the other hand, as can be seen from the results of embodiments 1 to 3, when θmax is equal to or smaller than 30°, endurance strength extends greatly. And, when θmax is equal to or smaller than 20°, the endurance strength extends more greatly and, even when the test time passes five times the target time, the trunnion did not break and thus the test was cut off by $5 \times 10^6$.

As described above, although an excessive stress is concentrated on the connecting portion A between the main body plane portion 18 and pivot shaft portion 10 of the trunnion 11, by allowing the metal flows 32 of the blank material to extend along the connecting portion A in this area, the metal flows 32 are prevented from being cut in the portion where the stress is concentrated, thereby being able to enhance the strength of the trunnion 11. As a result of this, even when the load is input repeatedly, the trunnion is prevented against crack, which makes it possible to enhance the durability of the toroidal-type continuously variable transmission.

By manufacturing the trunnion 11 by forging in such a manner that the metal flows 32 are allowed to extend along the connecting portions A in these areas, the cutting operation of the trunnion can be reduced greatly.

By the way, in the above-mentioned embodiment, the circular hole 19, which is used to hold the displacement shaft 10 rotatably through the needle bearing 20, is formed by cutting in the main body plane portion 18 of the trunnion 11. However, in case where the trunnion 11 is formed by forging in such a manner that the metal flows 32 extend around the circular hole 19, the strength of the trunnion 11 can be increased further.

Also, the invention is not limited to a trunnion for use in a toroidal-type continuously variable transmission of a single cavity type but can also be applied to a trunnion for use in a cavity type.

In case that the metal flow that is nearest to the angular portion does not contact with the first and second surfaces, the inclination angles $\theta_1$ and $\theta_2$ can be defined at points that intersects the metal flow that is nearest to the angular portion with the imaginary lines extending from the first and second surfaces. That is, the inclination angles $\theta_1$ and $\theta_2$ can be defined by the nearest metal flow at the above points and the lines parallel to the first and second surfaces.

While only certain embodiments of the invention have been specifically described herein, it will apparent that numerous modifications may be made thereto without departing from the spirit and scope of the invention.

As has been described heretofore, according to a first aspect of the invention, since the two connecting portions between the main body plane portion of the trunnion and the pair of pivot shaft portions respectively formed in the two end portions of the trunnion integrally therewith respectively form continuous metal flows, even when the trunnion receives an excessive load repeatedly, the trunnion is prevented against damage, thereby being able to enhance the durability of the trunnion.

Also, according to a second aspect of the invention, due to the fact that the trunnion is manufactured by forging, not only the mechanical working of the trunnion can be reduced greatly but also continuous metal flows can be formed in the connecting portions, so that, even when the trunnion receives an excessive load repeatedly, the trunnion is prevented against damage, thereby being able to enhance the durability of the trunnion.

What is claimed is:

1. A toroidal-type continuously variable transmission comprising:

an input disk;

an output disk disposed coaxially with said input disk;

a trunnion swingable about a pivot shaft portion with respect to the respective center axes of said input and output disks; and a power roller rotatably supported on said trunnion, said power roller being contactable with said input and output disks while inclining therebetween, wherein said trunnion comprises:

a main body plane portion for holding a displacement shaft rotatably supporting said power roller;

a pair of pivot shaft portions respectively provided in end portions of said main body plane portion and formed integral with said main body plane portion; and connecting portions provided between said main body plane portion and said pair of pivot shaft portions, said connecting portions being respectively formed with continuous metal flows.

2. A toroidal-type continuously variable transmission according to claim 1, wherein said connecting portions include an angular portion defined by a first surface extending in parallel to a trunnion axis center and a second surface extending at right angles to said trunnion axis center, and the maximum angle of two angles respectively formed between the metal flow that is nearest to said angular portion and each of said first and second surfaces is set to be 30° or less.

3. A toroidal-type continuously variable transmission according to claim 2, wherein said maximum angle is set to be 20° or less.

4. A toroidal-type continuously variable transmission according to claim 1, wherein said connecting portion includes an angular portion defined by a first surface extending in parallel to a trunnion axis center and a second surface extending at right angles to said trunnion axis center, and the maximum angle of two angles respectively formed between the metal flow that is nearest to said angular portion and each of said first and second surfaces is set to be 20° or less.

5. A method for manufacturing a trunnion capable of swinging about a pivot shaft portion with respect to the respective center axes of coaxially disposed input and output disks, said method comprising the steps of:

preparing a round rod including metal flows respectively extending in parallel to an axial direction of said round rod as the blank material of said trunnion; and forging said round rod from a direction at right angles to the axis of said round rod by using upper and lower forging dies so as to form a space defined by an imaginary cross section including a trunnion axis of said trunnion.

* * * * *